United States Patent
Nagano et al.

(10) Patent No.: US 7,839,255 B2
(45) Date of Patent: Nov. 23, 2010

(54) COMPOSITE TRANSFORMER AND POWER CONVERTER USING SAME

(75) Inventors: Masao Nagano, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 12/453,822

(22) Filed: May 22, 2009

(65) Prior Publication Data

US 2009/0289751 A1    Nov. 26, 2009

(30) Foreign Application Priority Data

May 22, 2008    (JP)    .............. 2008-133725

(51) Int. Cl.
*H01F 17/04*    (2006.01)
*H01F 27/02*    (2006.01)
*H01F 27/34*    (2006.01)
*H01F 27/28*    (2006.01)
*H02M 7/00*    (2006.01)
*H02M 7/537*    (2006.01)
*G05F 1/00*    (2006.01)
*G05F 3/16*    (2006.01)

(52) U.S. Cl. .............. 336/221; 336/83; 336/131; 336/181; 336/182; 336/220; 336/222; 323/282; 323/225; 323/271; 363/123; 363/131

(58) Field of Classification Search .............. None
See application file for complete search history.

(56) References Cited

U.S. PATENT DOCUMENTS

| 2,586,657 | A | * | 2/1952 | Holt, Jr. ............... 323/335 |
| 3,195,076 | A | * | 7/1965 | Morrison ............... 333/26 |
| 4,910,482 | A | * | 3/1990 | Takagai et al. ........ 333/181 |
| 5,053,738 | A | * | 10/1991 | Sato et al. ............ 336/165 |
| 5,481,238 | A | * | 1/1996 | Carsten et al. ........ 336/214 |
| 2006/0103359 | A1 | * | 5/2006 | Watanabe et al. ...... 323/225 |
| 2008/0297126 | A1 | * | 12/2008 | Nagano et al. ......... 323/271 |

FOREIGN PATENT DOCUMENTS

JP    2006-149054    6/2006

* cited by examiner

*Primary Examiner*—Elvin G Enad
*Assistant Examiner*—Mangtin Lian
(74) *Attorney, Agent, or Firm*—Squire, Sanders & Dempsey L.L.P.

(57) ABSTRACT

A composite transformer, having first and second inductors and a transformer, includes a transformer core that has a core leg around which portions of first and second windings are wound, and a base fixing the core leg, a first inductor core that has a core leg around which a portion of the first winding is wound and a base fixing the core leg, and a second inductor core that has a core leg around which a portion of the second winding is wound and a base fixing the core leg. The first and second windings are wound in a manner that flux are cancelled with each other, and are wound around the core leg of the transformer core in a manner alternately overlapping with each other, and are wound around respective core legs of the first and second inductor cores so as to be apart from each other to suppress any interference of magnetic fluxes.

9 Claims, 14 Drawing Sheets

COMPOSITE TRANSFORMER AND POWER CONVERTER USING SAME

CROSS REFERENCE TO RELATED APPLICATIONS

This application claims the foreign priority benefit under Title 35, United States Code, §119(a)-(d) of Japanese Patent Application No. 2008-133725, filed on May 22, 2008 in the Japan Patent Office, the disclosure of which is herein incorporated by reference in its entirety.

BACKGROUND OF THE INVENTION

1. Field of the Invention

The present invention relates to a composite transformer and a power converter including the same, and more particularly, a composite transformer achieving reduction in size and weight by increasing the degree of magnetic coupling, and a power converter including the same.

2. Description of the Related Art

JP2006-149054A discloses various voltage converters achieving reduction in size and weight to easily ensure electrical energy used in an electric vehicle or the like.

A conventional DC-DC converter has an inductor and a transformer connected to the inductor, which are discretely provided.

SUMMARY OF THE INVENTION

A first aspect of the present invention provides a composite transformer comprising first and second windings which generate magnetic fluxes when excited and which are wound to form a first inductor, a second inductor, and a transformer, the composite transformer further comprising: a transformer core including a core leg around which a portion of the first winding and a portion of the second winding are wound, and a base fixing the core leg thereof; a first inductor core including a core leg around which another portion of the first winding is wound, and a base fixing the core leg thereof; and a second inductor core including a core leg around which another part of the second winding is wound, and a base fixing the core leg thereof. The first winding and the second winding are wound in such directions that magnetic fluxes generated by the first and second windings are cancelled with each other. The first winding and the second winding are wound around the core leg of the transformer core so as to be alternately overlapped with each other, and are respectively wound around the core leg of the first inductor core and the core leg of the second inductor so as to be apart from each other to suppress interference of the magnetic fluxes generated by the first and second windings.

According to the first aspect of the present invention, the first winding and the second winding are wound to form the first and second inductors and the transformer, and the inductors and the transformer share the windings, so that a connection part between the individual inductors and the transformer can be eliminated, thereby eliminating a space for a connection part and any influences of an electrical resistance.

Moreover, as the first and second windings are wound in a direction in which the directions of magnetic fluxes generated by respective windings are cancelled with each other, and are wound around the core leg of the transformer core in such a manner as to alternately overlap with each other, the degree of magnetic coupling between the first winding and the second winding is increased, a direct-current residual flux is reduced, thereby suppressing any magnetic saturation of the transformer core.

Further, the first and second windings are wound around the respective core legs of the first and second inductor cores in such a manner as to be apart from each other to suppress any interference of magnetic fluxes generated by respective windings, so that a closed magnetic path is formed, thereby enabling the inductors to fulfill the function effectively.

Thus, the composite transformer of the present invention achieves reduction in size and weight.

A second aspect of the present invention provides a composite transformer according to the first aspect, wherein the first and second windings have the same winding length.

According to the second aspect of the present invention, winding resistances become equal, and the amount of magnetic fluxes cancelled with each other can be made uniform by maintaining a current balance between the first winding and the second winding. Moreover, it is possible to suppress unevenness of heat generation due to unbalancing of the winding resistances.

A third aspect of the present invention provides a composite transformer according to the first aspect, wherein the first and second windings have the same width.

According to the third aspect of the present invention, winding resistances become equal, and the amount of magnetic fluxes cancelled with each other can be made uniform by maintaining a current balance between the first winding and the second winding. Moreover, it is possible to suppress unevenness of heat generation due to unbalancing of the winding resistances.

A fourth aspect of the present invention provides a composite transformer according to the first aspect, wherein the transformer core comprises divisional core pieces and the divisional core pieces are symmetrical relative to a divisional plane.

According to the fourth aspect of the present invention, the flux density at the transformer core can be made uniform to make the amount of magnetic fluxes to be cancelled with each other uniform, so that it is possible to suppress any magnetic saturation of the transformer core, thereby achieving the reduction in size and weight.

A fifth aspect of the present invention provides a power converter comprising the composite transformer according to the first aspect, the power converter comprising: first and second input/output terminals, the first input/output terminal comprising a first positive terminal and a common reference terminal that is a negative terminal, the second input/output terminal comprising a second positive terminal and the common reference terminal, the first positive terminal of the first input/output terminal being connected to one ends of the first winding and the second winding; a first switching device including one end connected to another end of the first winding, and another end connected to the common reference terminal; a second switching device including one end connected to another end of the first winding, and another end connected to the second positive terminal of the second input/output terminal; a third switching device including one end connected to another end of the second winding, and another end connected to the common reference terminal; and a fourth switching device including one end connected to another end of the second winding, and another end connected to the second positive terminal.

According to the power converter circuit of the fifth aspect of the present invention, a boosting/bucking circuit which performs a boosting operation and a bucking operation can be formed.

That is, in the boosting operation, for example, the first and third switching devices are alternately turned ON/OFF, and the second and fourth switching devices are maintained in the OFF state, so that an excitation current and a load current due to mutual induction alternately flow through the first and second windings, respectively, thereby accomplishing the boosting operation. In the boosting operation, an input voltage is applied to the first input/output terminal, and an output voltage is output at the second input/output terminal.

Conversely, in the bucking operation, for example, the second and fourth switching devices are alternately turned ON/OFF, and the first and third switching devices are maintained in the OFF state, so that an excitation current and a load current due to mutual induction alternately flow through the first and second winding, respectively, thereby accomplishing the bucking operation. In the bucking operation, an input voltage is applied to the second input/output terminal, and an output voltage is output from the first input/output terminal.

A sixth aspect of the present invention provides a power converter comprising the composite transformer according to the first aspect, the power converter comprising: input and output terminals, the input terminal comprising a first positive terminal and a common reference terminal that is a negative terminal, the output terminal comprising a second positive terminal and the common reference terminal, the first positive terminal of the input terminal being connected to one ends of the first winding and the second winding; a first switching device including one end connected to another end of the first winding, and another end connected to the common reference terminal; a first diode which includes one end connected to another end of the first winding, and another end connected to the second positive terminal of the output terminal, wherein a forward direction of the first diode is from another end of the first winding toward the second positive terminal; a second switching device including one end connected to another end of the second winding, and another end connected to the common reference terminal; and a second diode which includes one end connected to another end of the second winding, and another end connected to the second positive terminal. A forward direction of the second diode is from another end of the second winding toward the second positive terminal.

The power converter circuit according to the sixth aspect of the present invention is a power converter circuit of the fifth aspect of the present invention in which the second and fourth switching devices are replaced with the first and second diodes, respectively.

According to such a power converter circuit, for example, the first and second switching devices are alternately turned ON/OFF, so that an excitation current and a load current due to mutual induction alternately flow through the first and second windings, respectively, thereby accomplishing the boosting operation.

A seventh aspect of the present invention provides a power converter comprising the composite transformer according to the first aspect, the power converter comprising: input and output terminals, the output terminal comprising a first positive terminal and a common reference terminal that is a negative terminal, the input terminal comprising a second positive terminal and the common reference terminal, the first positive terminal of the output terminal being connected to one ends of the first winding and the second winding; a first diode which includes one end connected to another end of the first winding, and another end connected to the common reference terminal, wherein a forward direction of the first diode is from the common reference terminal toward another end of the first winding; a first switching device including one end connected to another end of the first winding, and another end connected to the second positive terminal of the input terminal; a second diode which includes one end connected to another end of the second winding, and another end connected to the common reference terminal, wherein a forward direction of the second diode is from the common reference terminal toward another end of the second winding; and a second switching device including one end connected to another end of the second winding, and another end connected to the second positive terminal.

The power converter circuit according to the seventh aspect of the present invention is a power converter circuit of the fifth aspect of the present invention in which the first and third switching devices are replaced with the first and second diodes, respectively.

According to such a power converter circuit, for example, the first and second switching devices are alternately turned ON/OFF, so that an excitation current and a load current due to mutual induction alternately flow through the first and second windings, respectively, thereby accomplishing the bucking operation.

An eighth aspect of the present invention provides a power converter comprising the composite transformer according to the fifth aspect, wherein each of the switching devices comprises an IGBT.

A ninth aspect of the present invention provides a power converter comprising the composite transformer according to the fifth aspect, wherein each of the switching devices comprises a MOSFET.

BRIEF DESCRIPTION OF THE DRAWINGS

The object and features of the present invention will become more readily apparent from the following detailed description taken in conjunction with the accompanying drawings in which:

FIGS. 4A to 4C are plan views for explaining the operation of the composite transformer of the embodiment, wherein FIG. 4A shows magnetic flux generated by the second winding, FIG. 4B shows a state where magnetic fluxes generated by the first and second windings are combined together, and FIG. 4C shows magnetic flux generated by the first winding;

FIGS. 5A to 5C are cross-sectional views corresponding to FIGS. 4A to 4C, respectively, wherein FIG. 5A shows magnetic flux generated by the second winding, FIG. 5B shows a state where magnetic fluxes generated by the first and second windings are combined together, and FIG. 5C shows magnetic flux generated by the first winding;

FIGS. 7A and 7B are electrical circuit diagrams showing an embodiment of a DC/DC converter using the composite transformer, wherein FIG. 7A is a case where an IGBT is used as a switching device, and FIG. 7B is a case where a MOSFET is used as a switching device;

The same or corresponding elements or parts are designated with like references throughout the drawings.

DETAILED DESCRIPTION OF THE INVENTION

Prior to describing an embodiment of the present invention, the above-mentioned related art will be further argued. In the conventional DC-DC converter having an inductor and a transformer connected to the inductor, which are discretely provided, there is a problem that reduction in size and weight is difficult because windings of the inductor and the transformer should be connected with conductors, which results in increase in loss due to electrical resistance at conductors and junctions. This decreases a power converting efficient.

The present invention provides a composite transformer and a power converter having the same which reduce a magnetic flux leakage by increasing the degree of magnetic coupling, and which reduces a direct-current residual flux at a transformer, thereby achieving reduction in size and weight.

With reference to drawings will be described a composite transformer according to an embodiment of the present invention.

Figure 1:
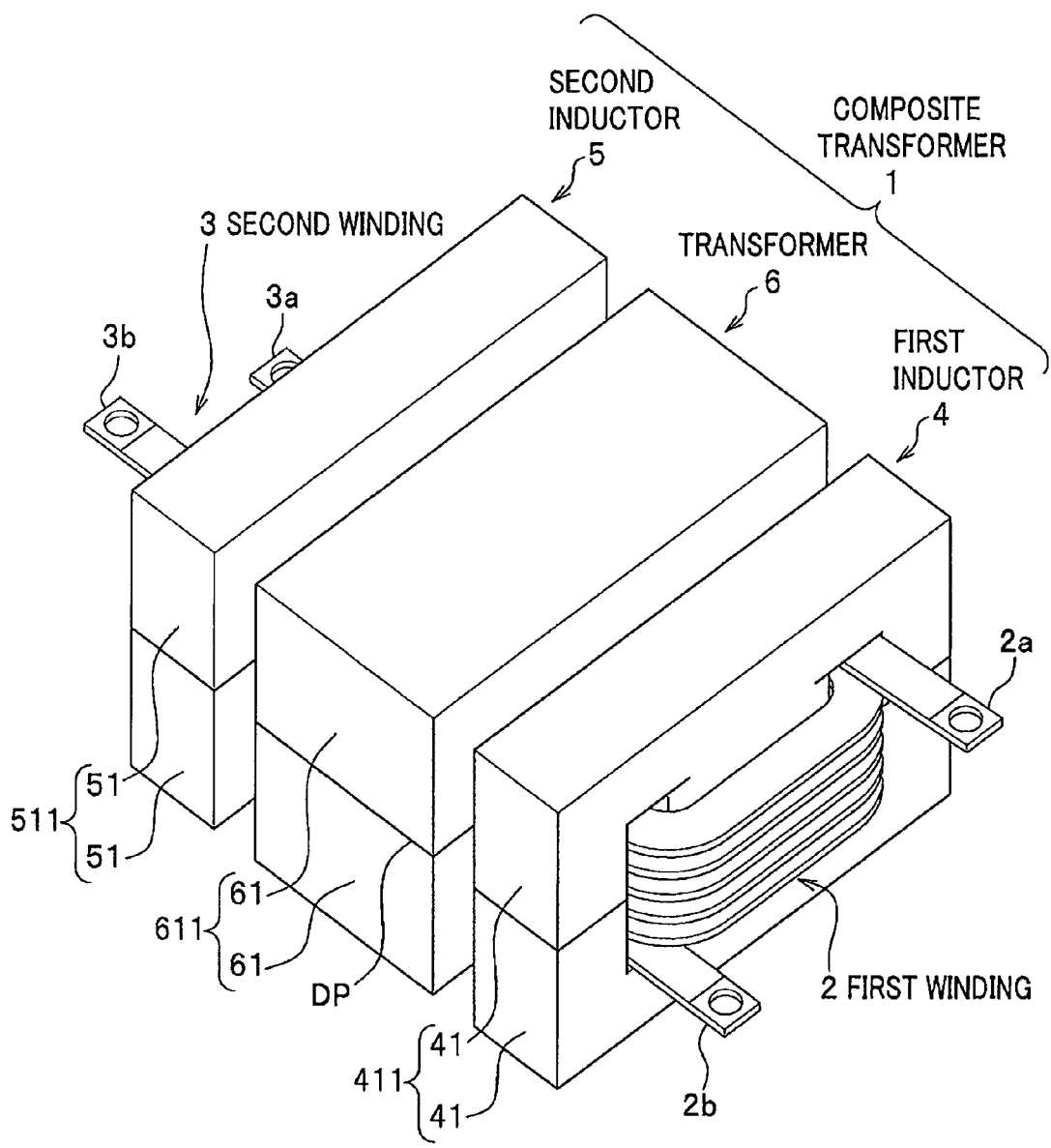
FIG. 1 is a perspective view of a composite transformer according to an embodiment of the present invention.
Figure 2:
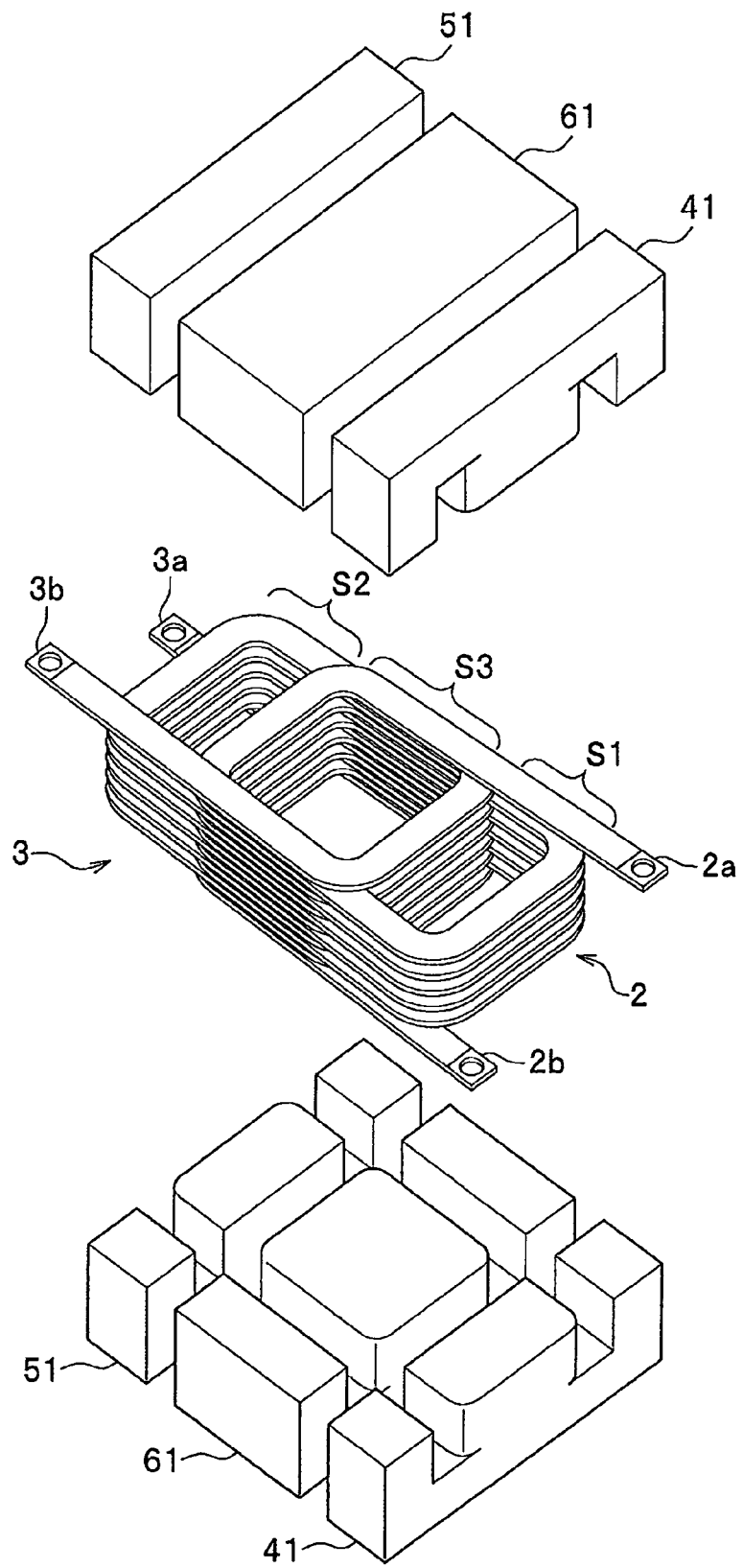
FIG. 2 is an exploded perspective view for showing a first winding and a second winding which are combined together.

As shown in FIGS. 1 and 2, a composite transformer 1 of the embodiment includes first and second windings 2, 3 each having an oblong rectangular cross section, first and second inductor cores 411, 511, and transformer core 611. The first and second inductor cores 411 and 511 include inductor core pieces 41 and 51, respectively. The transformer core 611 includes divisional core pieces 61, and divisional core pieces 61 are symmetrical relative to a divisional plane DP. The first winding 2 is wound like a coil around a central core leg 41a of the first inductor core 411 (mentioned later) and a central core leg 61a of the transformer core 611 and the second winding 3 is wound like a coil around a central core leg 51a of the second inductor core 511 and the central core leg 61a of the transformer core pieces 61 to configure a first inductor 4, a second inductor 5 which temporarily stores magnetic energy, and a transformer 6 which steps up and steps down a voltage (boosting/bucking operation).

As shown in FIG. 2, the first and second windings 2, 3 are each wound spirally in a rectangular shape in a planar view (see FIG. 3), and have areas S3 which configure the transformer 6 and which overlap alternately like a coil.

More specifically, the first winding 2 and the second winding 3 are wound in such a way that the area S3 of the first winding 2 and the area S3 of the second winding 3 alternately overlap with each other at the central portion to increase the degree of magnetic coupling.

Conversely, an area S1 of the first winding 2 which configures the first inductor 4 and an area S2 of the second winding 3 which configures the second inductor 5 are wound so as to be apart from each other in order to suppress mutual interference of magnetic fluxes generated at the respective inductors by allowing the areas S3 which configure the transformer 6 to intervene therebetween.

According to such a structure, a portion corresponding to the area S1 which is a part of the first winding 2 functions as the first inductor 4, a portion corresponding to the area S2 which is a part of the second winding 3 functions as the second inductor 5.

Moreover, a portion corresponding to the area S3 which is a part of the first winding 2 and the area S3 which is a part of the second winding 3 function as the transformer 6.

According to this structure, the composite transformer of the present invention needs only two windings to configure two inductors and one transformer, so that it is possible to reduce the number of parts and to reduce the weight, thereby achieving cost reduction.

Note that the first and second windings 2, 3 each has a flat rectangular cross section, and is wound as a rectangular coil in a planar view in the embodiment, but the present invention is not limited to such a configuration. For example, the winding may have a circular cross section, and may be wound annularly.

A typical example of the materials of the first and second windings 2, 3 are copper, but may be aluminum, silver, and other conductive metals which have a small electrical resistance and are advantageous for reducing the weight.

Figure 3:
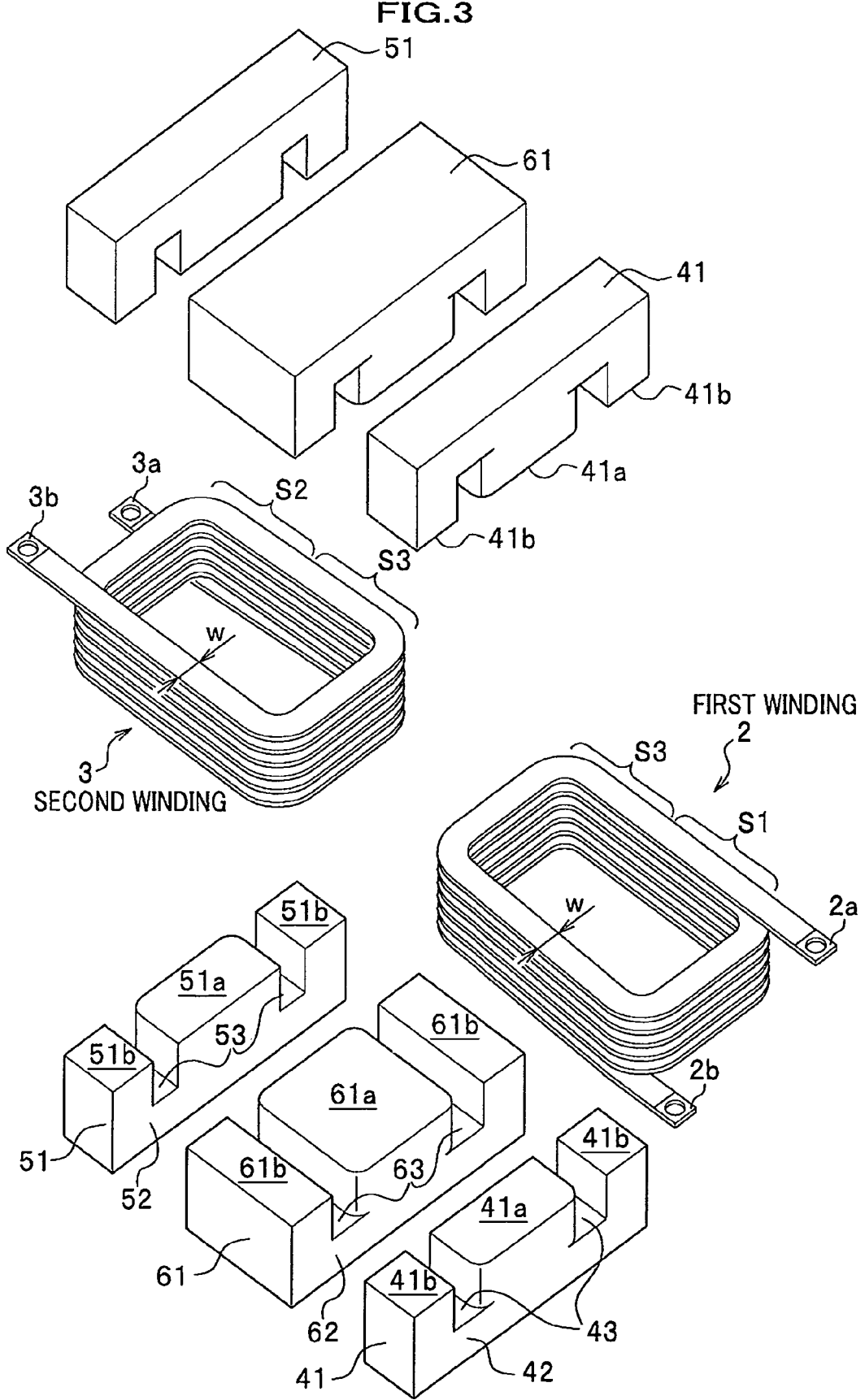
FIG. 3 is an exploded perspective view for explaining the structure of the first winding and that of the second winding.

As shown in FIG. 3, the first winding 2 has an upper input terminal 2a and a bottom output terminal 2b, and is wound counterclockwise from top to bottom and from the input terminal 2a to the output terminal 2b in a planar view.

Conversely, the second winding 3 has different terminal positions from the first winding 2, has a bottom input terminal 3a and an upper output terminal 3b, and is wound clockwise from the input terminal 3a to the output terminal 3b, and from bottom to top in a planar view.

Note that the input terminals 2a, 3a and the output terminals 2b, 3b are named so with reference to inputting/outputting in a boosting operation to facilitate the explanation, but have no meaning of limiting a connection method and an application, and can be used as both "input terminal" and "output terminal".

Figure 21:
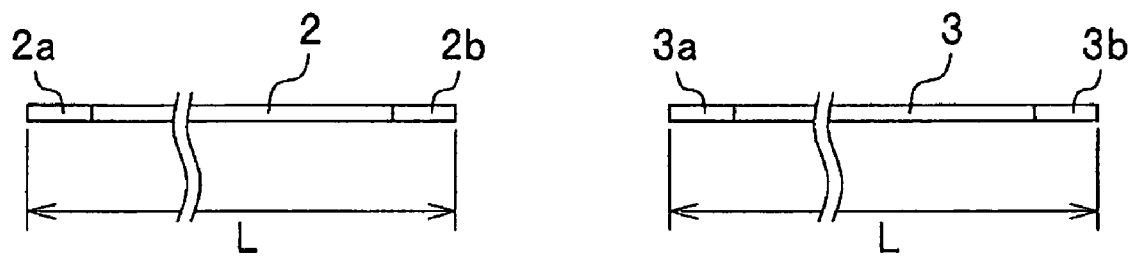
FIG. 21 is an illustration of the windings in an unwound state.

The first winding 2 and the second winding 3 are configured in such a manner as to have the same winding width was shown in FIG. 3 and the same winding length (total lengths of the windings) L as shown in FIG. 21 in which the first and second windings 2 and 3 are shown in an unwound manner. The areas S3 where the first winding 2 and the second winding 3 alternately overlap with each other are so arranged as to have the identical winding width w, thereby increasing the degree of magnetic coupling.

As the first winding 2 and the second winding 3 have the same winding width w and winding length L, the winding resistances becomes equal, and by maintaining the current balance between the first and second windings 2, 3, the amount of magnetic fluxes to be cancelled becomes equal. Moreover, it is possible to suppress unevenness of heat generation due to unbalancing of the winding resistances.

As shown in FIG. 3, the first inductor 4 has the first inductor core pieces 41, 41 having a symmetrical E-shaped divisional structure (so-called EE cores).

The first inductor core pieces 41, 41 each has a central core leg 41a around which a winding portion corresponding to the area S1 of the first winding 2 is wound, outer core legs 41b, 41b provided outwardly of the central core leg 41a, and a base 42 which fixes those core legs 41a, 41b.

The first winding 2 is wound in such a manner as to be accommodated in grooves 43 formed between the central core leg 41 and the respective outer core legs 41b. Accordingly, a closed magnetic path is formed through the central core leg 41a, the outer core legs 41b, and base 42 (see FIG. 5C).

As shown in FIG. 3, the second inductor 5 has the second inductor core pieces 51, 51 having a symmetrical E-shaped divisional structure (so-called EE cores).

Like the first inductor 4, the second inductor core pieces 51, 51 each has a central core leg 51a around which a winding portion corresponding to the area S2 of the second winding 3 is wound, outer core legs 51b, 51b provided outwardly of the central core leg 51a, and a base 52 which fixes those core legs 51a, 51b.

The second winding 3 is wound in such a manner as to be housed in grooves 53 formed between the central core leg 51a and the respective outer core legs 51b. Accordingly, a closed magnetic path is formed through the central core leg 51a, the outer core legs 51b, and the base 52 (see FIG. 5A).

As shown in FIG. 3, the transformer 6 has the transformer core pieces 61, 61 having a symmetrical E-shaped divisional structure (so-called EE cores).

The transformer core pieces 61, 61 each has a central core leg 61a around which the winding portion corresponding to the area S3 of the first winding 2 and the winding portion corresponding to the area S3 of the second winding 3 are alternately wound, outer core legs 61b, 61b provided outwardly of the central core leg 61a, and a base 62 which fixes those core legs 61a, 61b.

The first and second windings 2, 3 are wound in such a manner as to be accommodated in grooves 63 formed between the central core leg 61a and the respective outer core legs 61b. Accordingly, a closed magnetic path is formed through the central core leg 61a, the outer core legs 61b, and the base 62 (see FIG. 5B).

Figure 4A:
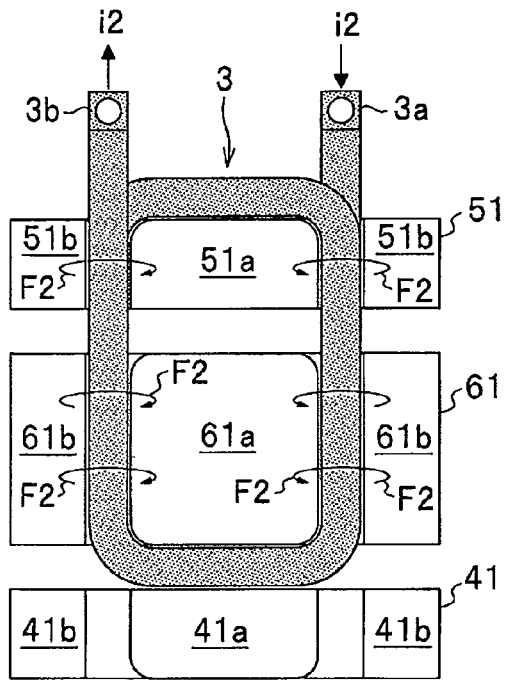
Figure 4B:
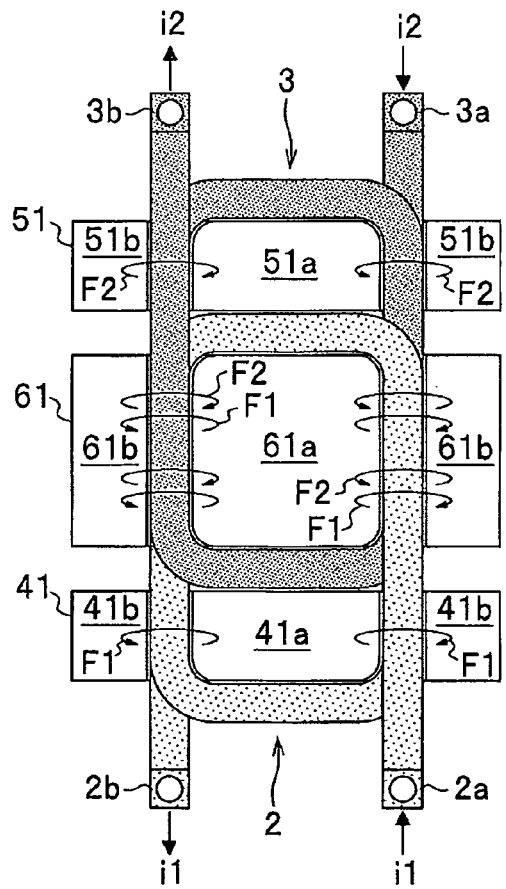
Figure 4C:
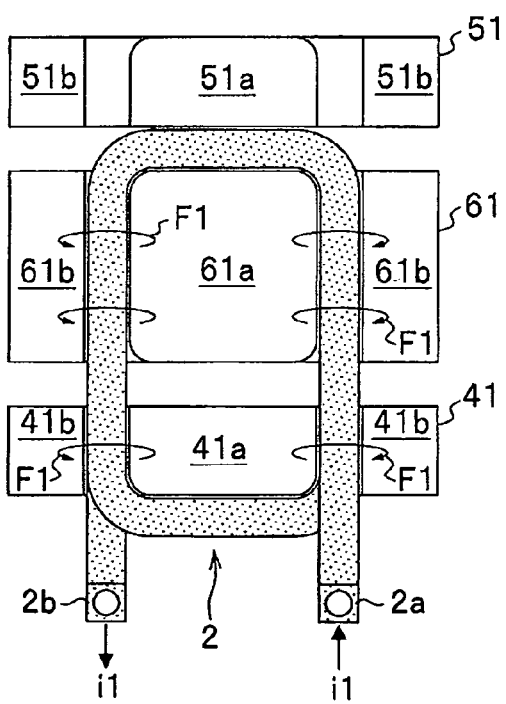
Figure 5A:
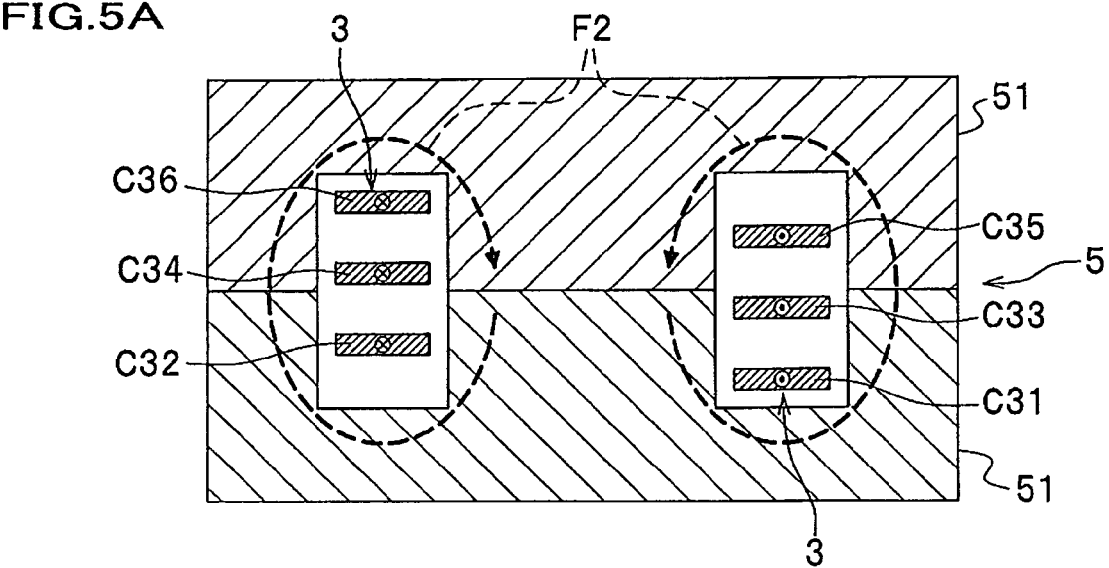
Figure 5B:
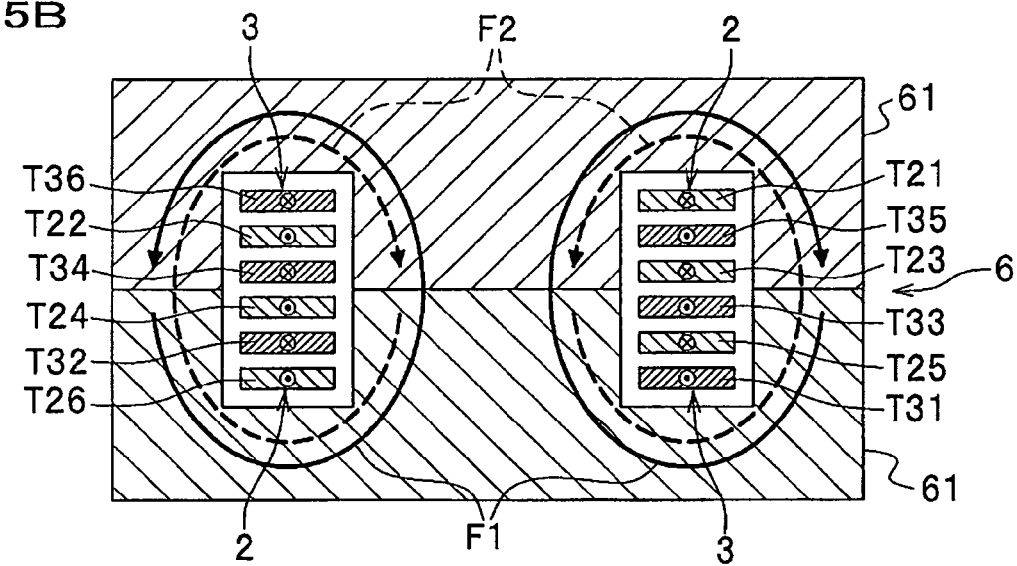
Figure 5C:
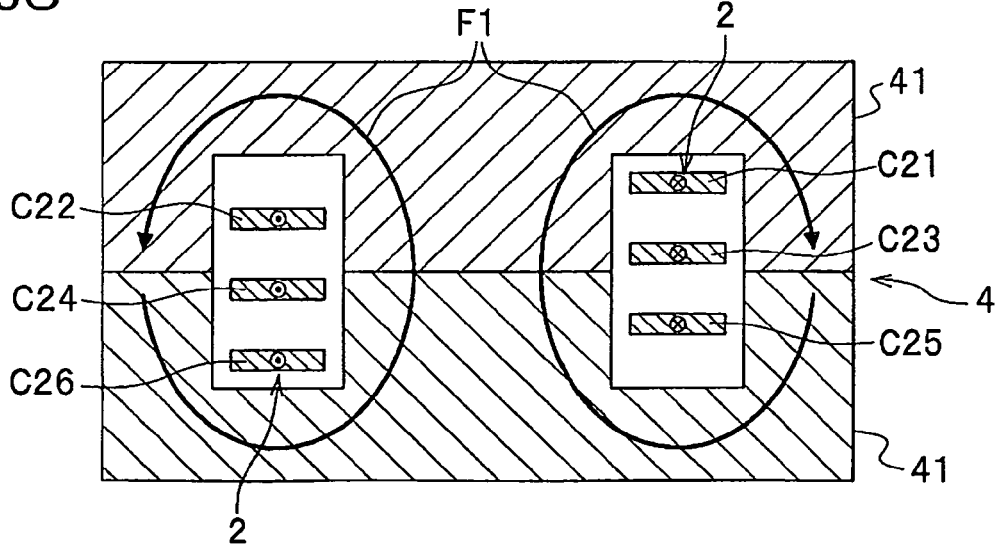

Next, an explanation will be given of the operation of the composite transformer 1 according to the embodiment with reference to FIGS. 4 and 5 mainly. FIGS. 4A to 4C are plan views for explaining the operation of the composite transformer 1, wherein FIG. 4A shows a magnetic flux generated by the second winding, FIG. 4B shows a state where magnetic fluxes generated by the first and second windings are combined, and FIG. 4C shows a magnetic flux generated by the first winding. FIGS. 5A to 5C are cross-sectional views corresponding to FIGS. 4A to 4C, respectively, wherein FIG. 5A shows a magnetic flux generated by the second winding, FIG. 5B shows a state where magnetic fluxes generated by the first and second windings are combined, and FIG. 5C shows a magnetic flux generated by the second winding.

When a current i1 flows from the input terminal 2a of the first winding 2 to the output terminal 2b thereof, as shown in FIG. 4C, a magnetic flux is generated in a direction in which a right-handed screw rotates relative to the forwarding direction of the current i1, so that a magnetic flux F1 is generated in a direction from the inner space of the first winding 2 to the outer space thereof in a planar view.

More specifically, in the first inductor 4, when a current i1 flows from the input terminal 2a located at the top to the output terminal 2b located at the bottom, as shown in FIG. 5C, the current i1 flows through winding portions C21 to C26 corresponding to the area S1 of the first winding 2 which functions as the first inductor 4, and a magnetic flux F1 is generated in the clockwise direction in the area at the right part of the figure, and a magnetic flux F1 is generated in the counterclockwise direction in the area at the left part of the figure.

At this time, in the area S3 of the first winding 2 which functions as the transformer 6, as shown in FIG. 5B, the current i1 flows through winding portions T21 to T26 corresponding to the area S3, and a magnetic flux F1 is generated in the clockwise direction in the area at the right part of the figure, and a magnetic flux F1 is generated in the counterclockwise direction in the area at the left part of the figure.

Conversely, when a current i2 flows from the input terminal 3a of the second winding 3 to the output terminal 3b, as shown in FIG. 4A, a magnetic flux is generated in a direction in which a right-handed screw rotates relative to the forwarding direction of the current i2, so that a magnetic flux F2 is generated in a direction from the outer space of the second winding 3 to the inner space thereof in a planar view.

More specifically, in the second inductor 5, when a current i2 flows from the input terminal 3a located at the bottom to the output terminal 3b located at the top, as shown in FIG. 5A, the current i2 flows through winding portions C31 to C36 corresponding to the area S2 of the second winding 3 which functions as the second inductor 5, and contrary to the first inductor 4, a magnetic flux F2 is generated in the counterclockwise direction in the area at the right part of the figure, and a magnetic flux F2 is generated in the clockwise direction in the area at the left part of the figure.

At this time, in the area S3 of the second winding 3 which functions as the transformer 6, as shown in FIG. 5B, the current i2 flows through winding portions T31 to T36 corresponding to the area S3, so that a magnetic flux F2 is generated in the counterclockwise direction in the area at the right part of the figure, and a magnetic flux F2 is generated in the clockwise direction in the area at the left part of the figure.

As the first winding 2 and the second winding 3 are wound in such a manner as to alternately overlap with each other, a magnetic flux F1 generated by the first winding 2 and a magnetic flux F2 generated by the second winding 3 are intimately affected with each other since the first and second windings 2, 3 are closely disposed, thereby increasing the degree of magnetic coupling.

As explained above, in comparing a case where a current flows from the input terminal 2a of the first winding 2 to the output terminal 2b thereof and a case where a current flows from the input terminal 3a of the second winding 3 to the output terminal 3b thereof, a magnetic flux generated by the first winding and a magnetic flux generated by the second winding have opposite directions in the transformer 6.

Since the first winding 2 and the second winding 3 are wound in directions in which the directions of magnetic fluxes generated by those windings are cancelled with each other, and are wound in such a manner as to alternately overlap at the central core leg 61a (see FIG. 3) of the transformer core piece 61, the degree of magnetic coupling between the first winding 2 and the second winding 3 is increased, a leakage of flux is reduced and a direct-current residual flux is reduced, thereby suppressing any magnetic saturation of the transformer core piece 61.

On the other hand, at the central core legs 41a, 51a of the first inductor core piece 41 and the second inductor core piece 51, the first and second windings 2, 3 are wound in such a way that magnetic fluxes generated by respective windings 2, 3 do not interfere with each other, so that individual closed magnetic paths are generated, thereby allowing the individual inductors to fulfill the function effectively.

Moreover, as the first winding 2 and the second winding 3 are wound so as to configure the first inductor 4 and the second inductor 5, and shared by the inductors 4, 5 and the transformer 6, it is possible to eliminate a connection part between the individual inductors 4, 5 and the transformer 6, thereby saving a space and eliminating any influence of an electrical resistance.

Thus, the composite transformer 1 of the present invention can achieve reduction in size and weight. Note that regarding the foregoing electrical and magnetic relationship, as a current flows through the first winding 2 and the second winding 3 in an opposite direction, the direction of a magnetic flux becomes also opposite.

Figure 6:
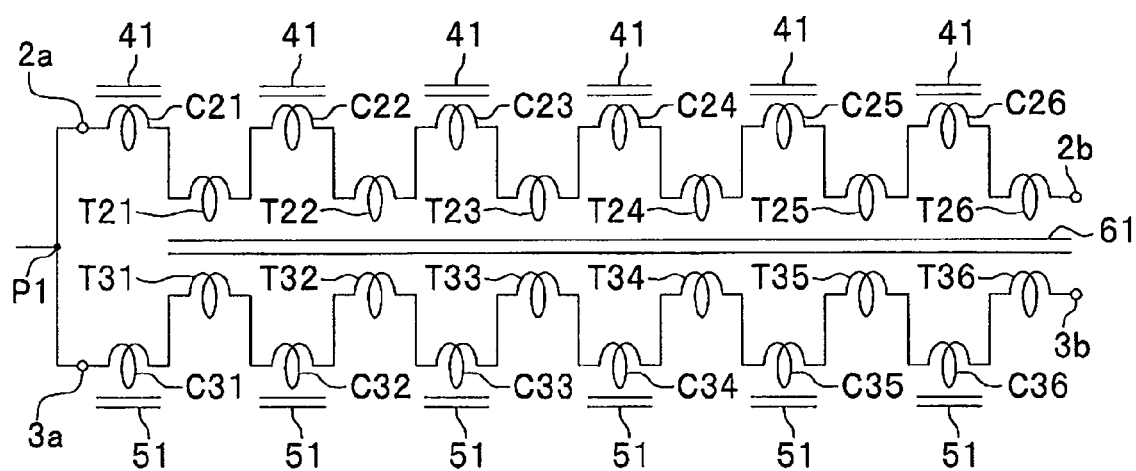
FIG. 6 is a circuit diagram showing an electrical equivalent circuit of the composite transformer of the embodiment based on the structure shown in FIGS. 5A to 5C.

The composite transformer 1 having the foregoing structure can be depicted in an equivalent circuit in FIG. 6. FIG. 6 is a circuit diagram showing an equivalent circuit of the composite transformer 1 based on the structure shown in FIG. 5.

The equivalent circuit of the composite transformer 1 can be depicted with the first and second windings 2, 3, the first and second inductors 4, 5, and the transformer 6.

Regarding a circuit element corresponding to the first winding 2 between the input terminal 2a and the output terminal 2b, it is possible to divide the first winding into the area S1 (see FIG. 2) for the first inductor 4 and the area S3 (see FIG. 2) for the transformer 6. The area S1 for the first inductor 4 corresponds to the winding portions C21 to C26 (see FIG. 5C). The area S3 for the transformer 6 corresponds to the winding portions T21 to T26 (see FIG. 5B).

On the other hand, regarding a circuit element corresponding to the second winding 3 between the input terminal 3a and the output terminal 3b, it is possible to divide the second winding 3 into the area S2 (see FIG. 2) for the second inductor 5 and the area S3 (see FIG. 2) for the transformer 6. The area S2 for the second inductor 5 corresponds to the winding portions C31 to C36 (see FIG. 5A). The area S3 for the transformer 6 corresponds to the winding portions T31 to T36 (see FIG. 5B).

Figure 7A:
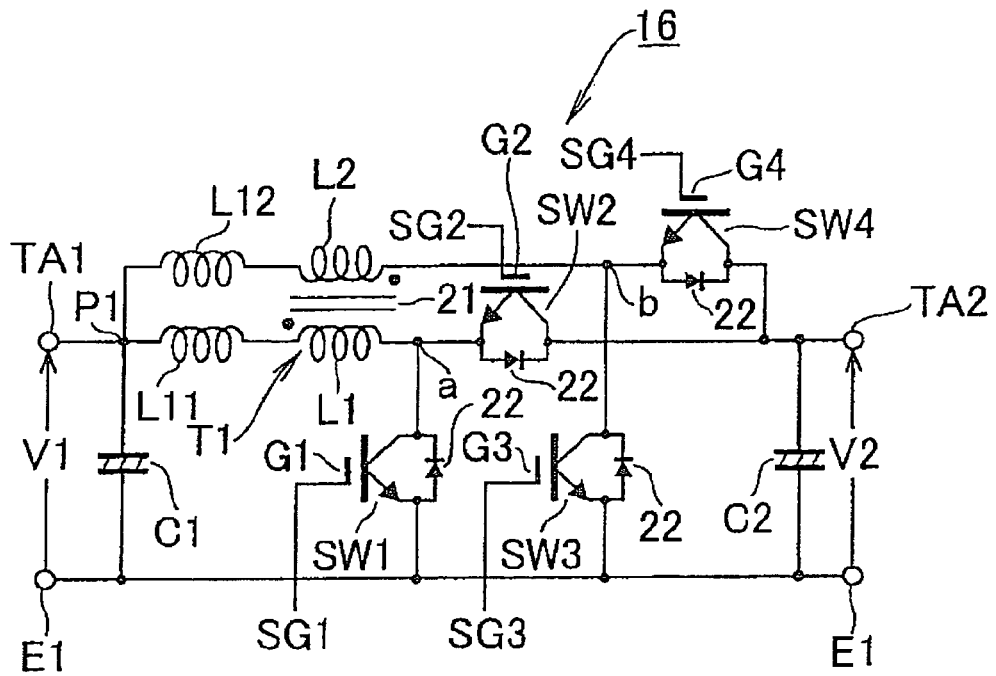

Next, an explanation will be given of a circuit structure of a DC/DC converter 16 which is a boosting/bucking circuit (power converter) using the composite transformer 1 of the embodiment with reference to FIG. 7A. FIG. 7A is a circuit diagram of the DC/DC converter 16 for explaining the boosting/bucking circuit using the composite transformer 1 of the embodiment.

As shown in FIG. 7A, the DC/DC converter 16 is a two-port circuit (four-terminal circuit), and when used as a boosting DC/DC converter, a left port becomes a low voltage input port, while a right port becomes a high voltage output port. When used as a bucking DC/DC converter, the high voltage output port becomes an input port, while the low voltage input port at the left becomes an output port, so that the functions of such ports become opposite to the case of boosting.

The DC/DC converter 16 comprises a smoothing capacitor C1, inductors (coils) L11, L12, a transformer T1, four switching devices SW1, SW2, SW3, SW4, and a smoothing capacitor C2.

A circuit portion comprised of the inductors L11, L12 and the transformer T1 employs the composite transformer 1. The inductors L11, L12 respectively correspond to the first and second inductors 4, 5, and the transformer T1 corresponds to the transformer 6. A node P1 of the inductors L11, L12 matches a left node P1 shown in FIG. 6.

The smoothing capacitor C1 is connected between a common reference terminal (in general, grounding terminal) E1 and a terminal TA1, and the smoothing capacitor C2 is connected between the common reference terminal E1 and a terminal TA2. As a direct-current voltage V1 is input into the terminal TA1, a direct-current voltage V2 is output at the terminal TA2. The magnitude correlation between the direct-current voltage V1 and the direct-current voltage V2 is V1<V2. The terminals TA1, TA2 are both positive (plus) terminals.

The transformer T1 comprises a core (ferrite core, iron core, or like) 21, a primary winding L1 and a secondary winding L2. The core 21 corresponds to the transformer core pieces 61, the primary winding L1 corresponds to the first winding 2, and the secondary winding L2 corresponds to the second winding 3. The primary winding L1 and the secondary winding L2 are connected in a connection relationship by reverse winding connection. The turn ratio between the primary winding L1 and the secondary winding L2 is preferably 1:1. Dot symbols added to the respective primary and secondary windings L1, L2 indicate high potential sides when a voltage is induced. If a ferrite core is used for the core 21, it is possible to cope with high frequency and to reduce the weight of the core.

In the transformer T1, the primary winding L1 and the secondary winding L2 are magnetically coupled via the core 21. Since the turn ratio between the primary winding L1 and the secondary winding L2 is 1:1, as excitation current flows through either one of the windings, a voltage corresponding to the turn ratio of the secondary winding is induced at the other winding. For example, as the switching device SW1 turns ON and a current flows through the inductor L11 and the primary winding L1 based on an input voltage V1, a voltage is induced at the inductor L11 and the primary winding L1 in accordance with such a change. Further, as an excitation current flows through the primary winding L1, a voltage is induced at the secondary winding L2 because of mutual induction. Accordingly, a voltage acquired by adding the voltage of the inductor L12 and the induced voltage of the secondary winding L2 is generated at the terminal TA2 and a boosting operation is performed. The same is true of a case when the switching device SW3 is turned ON to energize the secondary winding L2 of the transformer T1. In this case, however, a voltage of the inductor L11 instead of the inductor L12 is used.

The four switching devices SW1 to SW4 each comprises an IGBT (Insulated Gate Bipolar Transistor) which has a capacity for allowing a large amount of current to flow and high withstand voltage (see FIG. 7A). The switching devices SW1 to SW4 each has a collector, an emitter, and a gate. Moreover, a forward diode 22 in a direction from the emitter to the collector is provided in parallel between the collector and the emitter of each switching device SW1 to SW4.

Figure 7B:
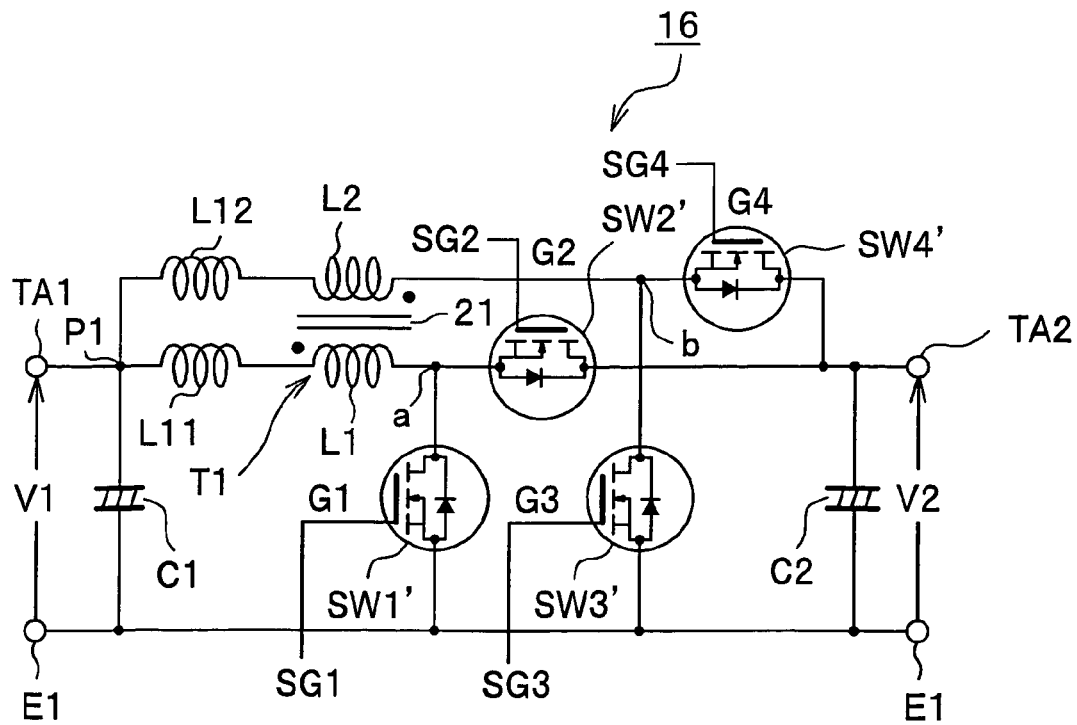

Although the IGBTs are used in the embodiment, MOSFETs (Metal-Oxide-Semiconductor Field-Effect Transistor) may be used (see switching devices SW'1 to SW'4 in FIG. 7B) as needed when it is necessary to operate in a high frequency range. In the case of using the MOSFETs, the MOSFET is connected in such a way that the direction of a parasitic diode is identical with the direction of the diode 22 in FIG. 7A.

The terminal TA1, i.e., an upper terminal of the smoothing capacitor C1 is connected to one ends of the inductors L11, L12, the other end of the inductor L11 is connected to one end of the primary winding L1 of the transformer T1, and the other end of the inductor L12 is connected to one end of the secondary winding L2 of the transformer T1. A parallel T circuit is provided between the terminal TA1 and the terminal TA2. The parallel T circuit comprises a first T circuit having the inductor L11, the primary winding L1 and the switching devices SW1, SW2, and a second T circuit having the inductor L12, the secondary winding L2, and the switching devices SW3, SW4.

In the first T circuit, a collector-emitter of the switching device SW1 is connected between a terminal a of the primary winding L1 and the common reference terminal E1, and a collector-emitter of the switching device SW2 is connected between the terminal a and the terminal TA2. In the second T circuit, a collector-emitter of the switching device SW3 is connected between a terminal b of the secondary winding L2 and the common reference terminal E1, and a collector-emitter of the switching device SW4 is connected between the terminal b and the terminal TA2. Gate signals SG1, SG2, SG3, and SG4 for controlling ON/OFF operation of respective switching devices are given from a non-illustrated control device to gates G1, G2, G3 and G4 of the four switching devices SW1 to SW4.

Next, an explanation will be given of operations of the boosting DC/DC converter 16. A boosting operation will be explained with reference to FIGS. 8 to 13, and a bucking operation will be explained with reference to FIGS. 14 to 19.

Figure 8:
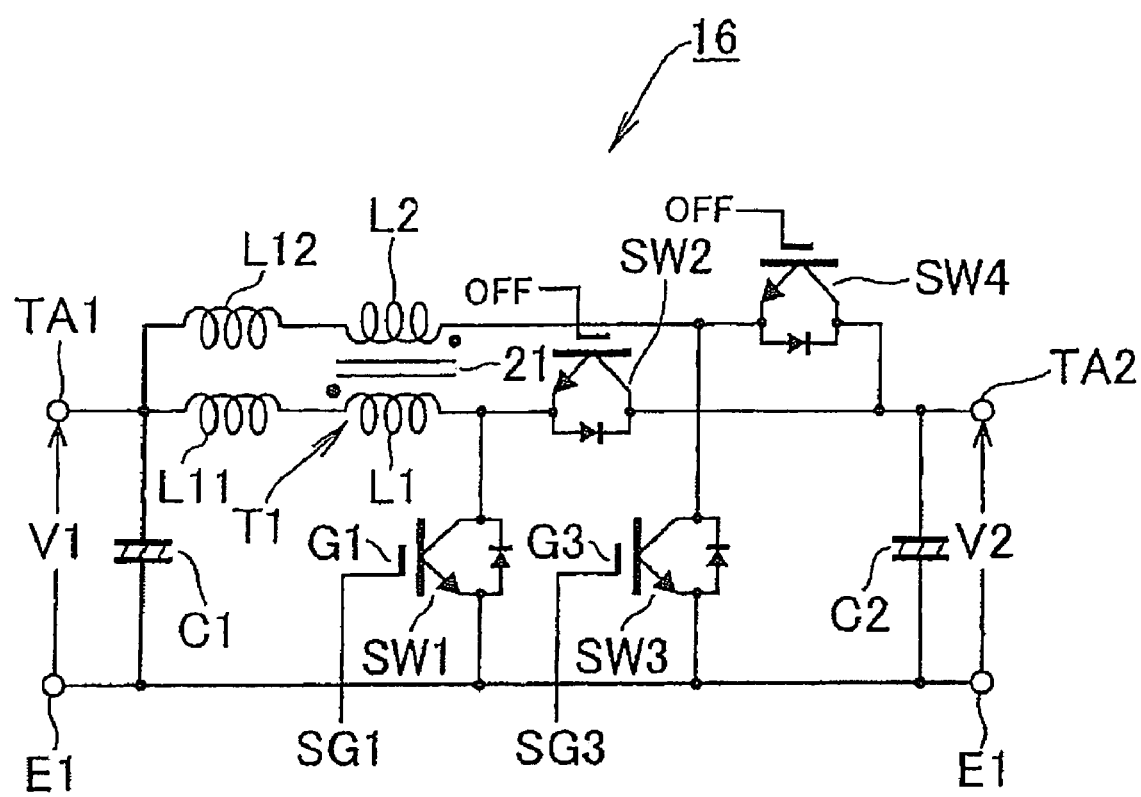
FIG. 8 is a diagram showing the structure of the DC/DC converter used as a booster.

The boosting operation will be explained first with reference to FIGS. 8 to 13. In order to cause the DC/DC converter 16 to do boosting, as shown in FIG. 8, the gate signals SG1, SG3 are supplied to the respective gates of the switching devices SW1, SW3 to turn ON/OFF the switching devices SW1, SW3. During the boosting operation, only OFF signals (OFF) are supplied to the respective gates of the switching devices SW2, SW4 to always keep the switching devices SW2, SW4 being in an OFF state. According to the boosting DC/DC converter 16, as shown in FIG. 8, a direct-current voltage V1 is an input voltage. In the boosting operation, the direct-current voltage V1 input into the left terminal TA1 is converted, and a direct-current voltage V2 greater than or equal to V1 is output at the right terminal TA2. The boosting operation is carried out in the forward direction from the left low-voltage side of the DC/DC converter 16 to the right high-voltage side.

Figure 9:
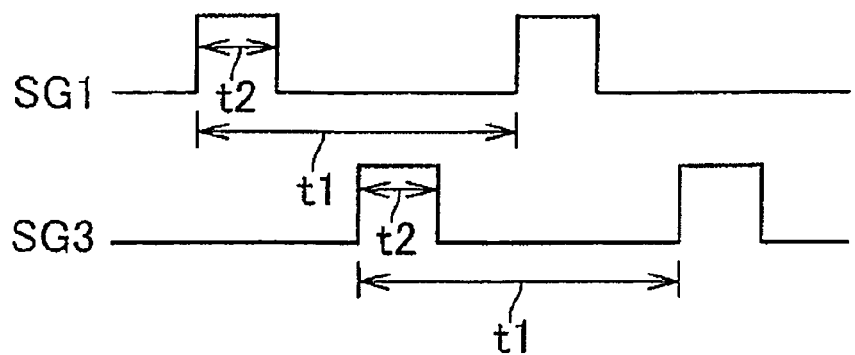
FIG. 9 is a waveform diagram showing gate signals when the DC/DC converter is used as a booster.

FIG. 9 shows signal waveforms of the gate signals SG1, SG3. The gate signals SG1, SG3 have a pulse waveform with the same period (t1) and the same duty (DUTY: t2), but have a phase shifted by a half period. The switching devices SW1, SW3 alternately repeat ON/OFF operations by the gate signals SG1, SG3. By arbitrarily changing the duty (t2) which sets the ON operation time of the switching device SW1, SW3 in such a manner as to be less than or equal to 50% for the switching device SW1, SW3, the output voltage V2 is boosted within a range from one to twice as much as the input voltage V1. Note that a switching control having a lap time at which the switching devices SW1, SW3 turn ON simultaneously may be carried out by setting the duty ratio to be greater than or equal to 50%. In this case, it is possible to achieve a boosting rate greater than or equal to the performances (e.g., inductor constant) of the inductors L11, L12.

Figure 10:
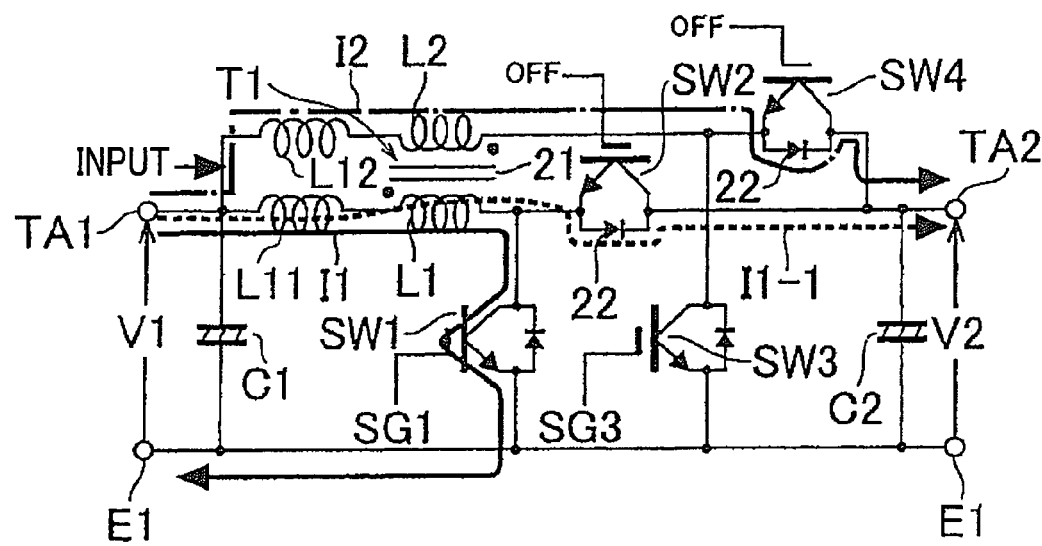
FIG. 10 is a diagram showing a first boosting operation example for explaining a boosting operation of the DC/DC converter.
Figure 11:
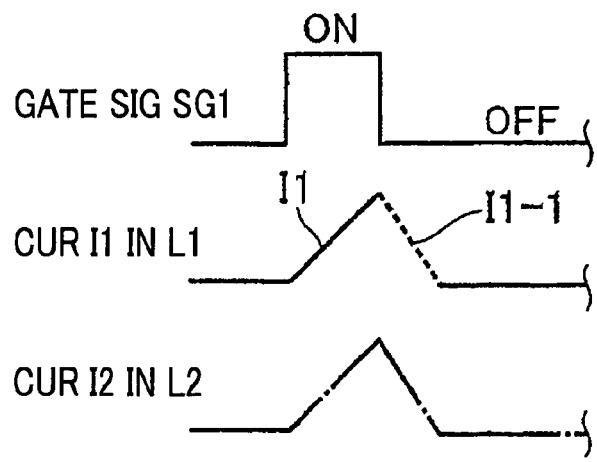
FIG. 11 is a waveform diagram showing the first boosting operation example of the DC/DC converter.
Figure 12:
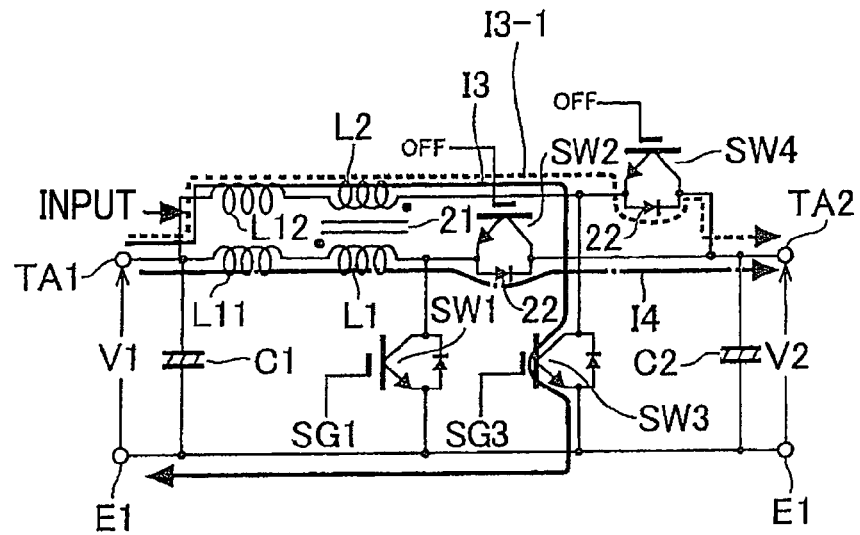
FIG. 12 is a diagram showing a second boosting operation example for explaining the boosting operation of the DC/DC converter.

Next, the boosting operation will be explained in detail with reference to FIGS. 10 to 13. FIG. 10 shows a flow of a current through individual circuit portions in the DC/DC converter 16 when only the switching device SW1 is turned ON to energize the primary winding L1 of the transformer T1. Moreover, FIG. 12 shows a flow of a current through individual circuit portions in the DC/DC converter 16 when only the switching device SW3 is turned ON to energize the secondary winding L2 of the transformer T1.

In the DC/DC converter 16 in a state shown in FIG. 10, the gate signal SG1 for turning ON/OFF the switching device SW1 is supplied to the gate of the switching device SW1. As shown in FIG. 11, as the gate signal SG1 is ON, the switching device SW1 turns ON. As the direct-current voltage V1 is input to the terminal TA1, when the switching device SW1 turns ON, an excitation current I1 flows through the primary winding L1 of the transformer T1. The excitation current I1 flows through the terminal TA1, the inductor L11, the primary winding L1, and the switching device SW1. The excitation current I1 gradually increases while the gate signal SG1 is being ON. As the gate signal SG1 becomes OFF, the excitation current I1 decreases. A dashed line L1-1 of the current I1 is a current which is caused to flow as energy stored in the inductor L11 is released. A current corresponding to the dashed line I1-1 decreases gradually as the inductance of the inductor L11 is large. This current flows through the primary winding L1, the diode 22 of the switching device SW2, and flows in the terminal TA2.

As the excitation current L1 flows through the primary winding L1 of the transformer T1 as explained above, a load current I2 flows through the secondary winding L2 because of mutual induction. The load current I2 flows through the diode 22 of the switching device SW4, and flows in the terminal TA2. As shown in FIG. 11, the load current I2 at the secondary winding L2 is generated with the substantially same change as the excitation current I1, and with the substantially same value as the excitation current I1 because of the turn ratio (1:1). The smoothing capacitor C2 is charged by the load current I2, and as a result, the direct-current voltage V2 based on the current I2 is output at the terminal TA2.

Figure 13:
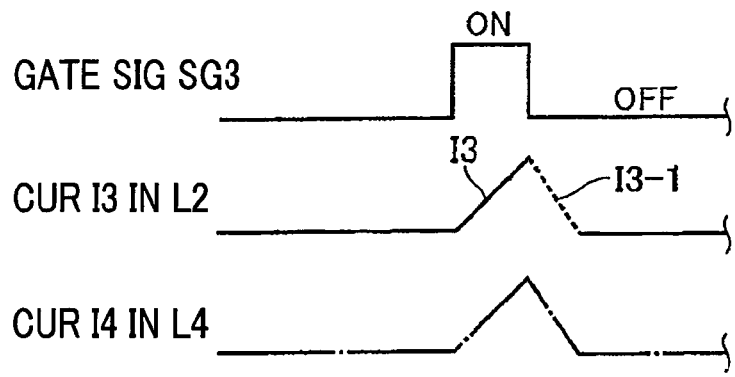
FIG. 13 is a waveform diagram for a second boosting operation example of the DC/DC converter.

Next, an explanation will be given of the example operation in FIG. 12. In the DC/DC converter 16 shown in FIG. 12, the gate signal SG3 for turning ON/OFF the switching device SW3 is supplied to the gate of the switching device SW3. As the gate signal SG3 is ON as shown in FIG. 13, the switching device SW3 turns ON. As the direct-current voltage V1 is input to the terminal TA1, and the switching device SW3 turns ON, an excitation current I3 flows through the secondary winding L2 of the transformer T1. The excitation current I3 flows through the terminal TA1, the inductor L12, the secondary winding L2, and the switching device SW3. The excitation current I3 gradually increases while the gate signal SG3 is being ON. As the gate signal SG3 becomes OFF, the current I3 decreases. A dashed line I3-1 of the current I3 shown in FIG. 13 is a current which flows as energy stored in the inductor L12 is released. A current corresponding to the dashed line I3-1 gradually decreases as an inductance of the inductor L12 is large. The current flows through the secondary winding L2 and the diode 22 of the switching device SW4, and flows in the terminal TA2.

As the excitation current I3 flows through the secondary winding L2 of the transformer T1 as explained above, a load current I4 flows through the primary winding L1 because of mutual induction. As shown in FIG. 13, the load current I4 at the primary winding L1 is generated with the substantially same change characteristic as the excitation current I3, and with the substantially same value as the excitation current I3 because of the turn ratio (1:1). The smoothing capacitor C2 is charged by the load current I4, and as a result, the direct-current voltage V2 based on the excitation current I4 is output at the terminal TA2.

As explained above, according to the boosting operation of the DC/DC converter 16, since the DC/DC converter 16 has magnetism-canceling circuit portions (L1, L2, 21), first, as the switching device SW1 turns ON and the switching device SW3 turns OFF, an excitation current flows through the primary winding L1, and a load current flows through the secondary winding L2. Second, as the switching device SW3 turns ON and the switching device SW1 turns OFF, an excitation current flows through the secondary winding L2 and load current flows through the primary winding L1. Since the transformer T1 is alternately excited positively and negatively in this fashion, a flux density area of the core is used more and more. Accordingly, even if the core is relatively small than the conventional ones, it is possible to cope with larger power. That is, the boosting DC/DC converter 16 can achieve reduction in size. In addition, since the composite transformer 1 is used as the inductors L11, L12 and the transformer T1, it is possible to reduce the size and the weight of the transformer part.

Figure 14:
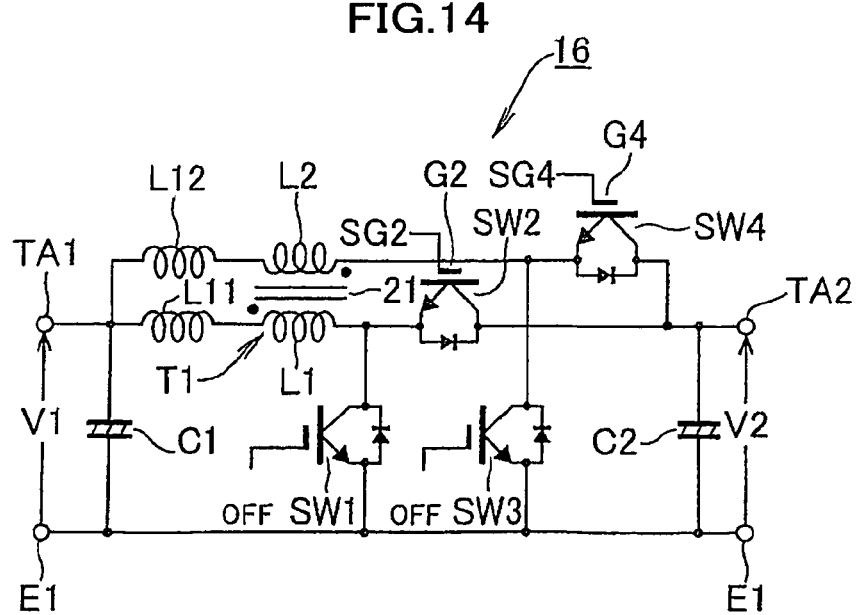
FIG. 14 is a diagram showing the structure of the DC/DC converter used as a bucking circuit.

Next, an explanation will be given of the bucking operation of the DC/DC converter 16 with reference to FIGS. 14 to 19. In order to cause the DC/DC converter 16 to do bucking, as shown in FIG. 14, the gate signals SG2, SG4 are supplied to the respective gates of the switching devices SW2, SW4 to turn ON/OFF the switching devices SW2, SW4. During the bucking operation, only OFF signals are supplied to the respective gates of the switching devices SW1, SW3 to keep the switching devices SW1, SW3 always OFF. According to the bucking DC/DC converter 16, as shown in FIG. 14, a direct-current voltage V2 is an input voltage. According to the bucking operation, the direct-current voltage V2 input to the right terminal TA2 is converted, and a direct-current voltage V1 less than or equal to V2 is output at the left terminal TA1. The bucking operation is carried out in the inverted direction from the right high-voltage side of the DC/DC converter 16 to the left low-voltage side.

Figure 15:
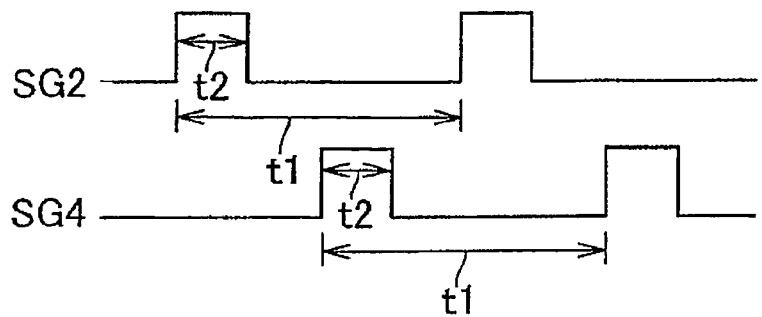
FIG. 15 is a waveform diagram showing gate signals when the DC/DC converter is used as a bucking circuit.

FIG. 15 shows signal waveforms of the gate signals SG2, SG4. The gate signals SG2, SG4 have a pulse waveform with the same period (t1) and the same duty (DUTY: t2), but have a shifted phase so that both switching devices SW2, SW4 do not simultaneously turn ON. The switching devices SW2, SW4 alternately repeats ON/OFF operations by the gate signals SG2, SG4. When the duty (t2) which sets the ON time of the switching device SW2, SW4 is less than or equal to 50%, the output voltage V1 can be bucked to a desired value within a range from 1 to 0.5 times as much as the input voltage V2, and when it is greater than or equal to 50%, the output voltage V1 can be bucked to a desired value within a range less than or equal to 0.5 times as much as the input voltage V2.

Figure 16:
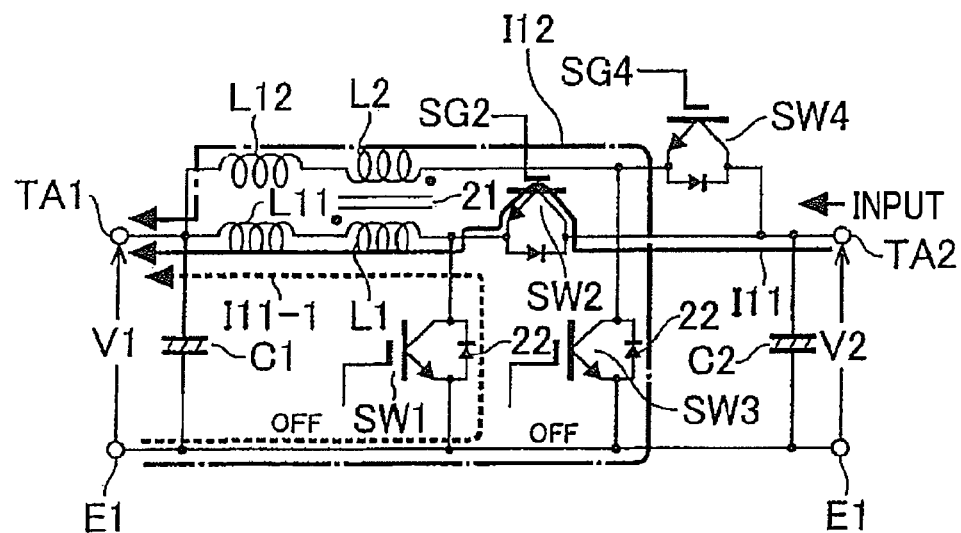
FIG. 16 is a diagram showing a first bucking operation example for explaining a bucking operation of the DC/DC converter.
Figure 17:
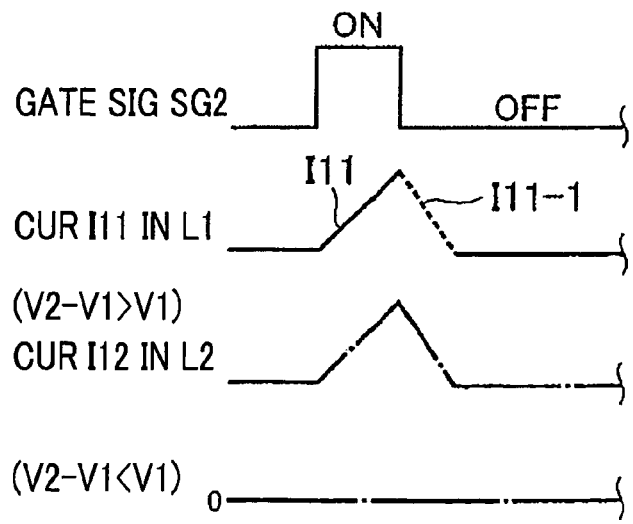
FIG. 17 is a waveform diagram for the first bucking operation example of the DC/DC converter.
Figure 18:
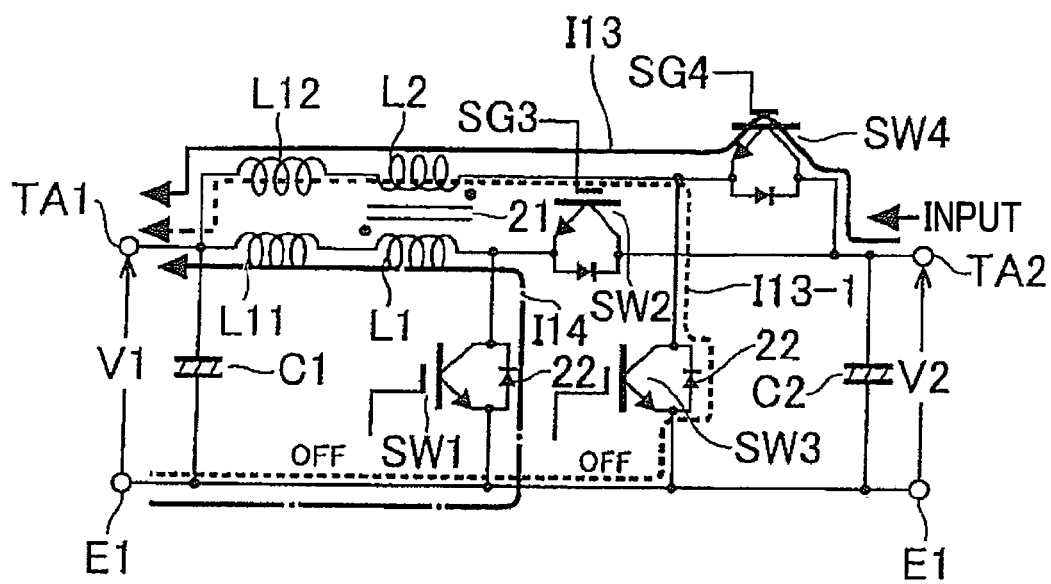
FIG. 18 is a diagram showing a second bucking operation example for explaining the bucking operation of the DC/DC converter.

Next, the bucking operation will be explained in detail with reference to FIGS. 16 to 19. FIG. 16 shows a flow of a current through individual circuit portions of the DC/DC converter 16 when only the switching device SW2 is turned ON to energize the primary winding L1 of the transformer T1. FIG. 18 shows a flow of a current through individual circuit portions of the DC/DC converter 16 when only the switching device SW4 is turned ON to energize the secondary winding L2 of the transformer T1.

In the DC/DC converter 16 shown in FIG. 16, the gate signal SG2 which turns ON/OFF the switching device SW2 is supplied to the gate of the switching device SW2. As shown in FIG. 17, as the gate signal SG2 is ON, the switching device SW2 turns ON. As a direct-current voltage V2 is input to the terminal TA2, when the switching device SW2 turns ON, an excitation current I11 flows through the primary winding L1 of the transformer T1. The excitation current I11 flows through the terminal TA2, the switching device SW2, the primary winding L1, the inductor L11 and the terminal TA1. The excitation current I11 gradually increases while the gate signal SG2 is being ON. As the gate signal SG2 becomes OFF, the current I11 decreases. A dashed line I11-1 of the current I11 shown in FIG. 17 is a current which flows because energy stored in the inductor L11 is released. The excitation current corresponding to the dashed line I11-1 gradually decreases as the inductance of the inductor L11 is large. The excitation current flows through the diode 22 of the switching device SW1, the primary winding L1, and the inductor L11, and flows in the terminal TA1.

When the excitation current I11 flows through the primary winding L1 of the transformer T1 as explained above, if V2−V1>V1, a load current I12 flows through the secondary winding L2 due to mutual induction, and if V2−V1<V1, no load current flows. The load current I12 flows through the diode 22 of the switching device SW3, and flows in the terminal TA1. The load current I12 at the secondary winding L2 is generated with the substantially same change characteristic as that of the excitation current I11 as shown in FIG. 17, and with the substantially same value based on the turn ratio (1:1). The smoothing capacitor C1 is charged by the load current I12, and as a result, a direct-current voltage V1 based on the current I12 is output to the terminal TA1.

Figure 19:
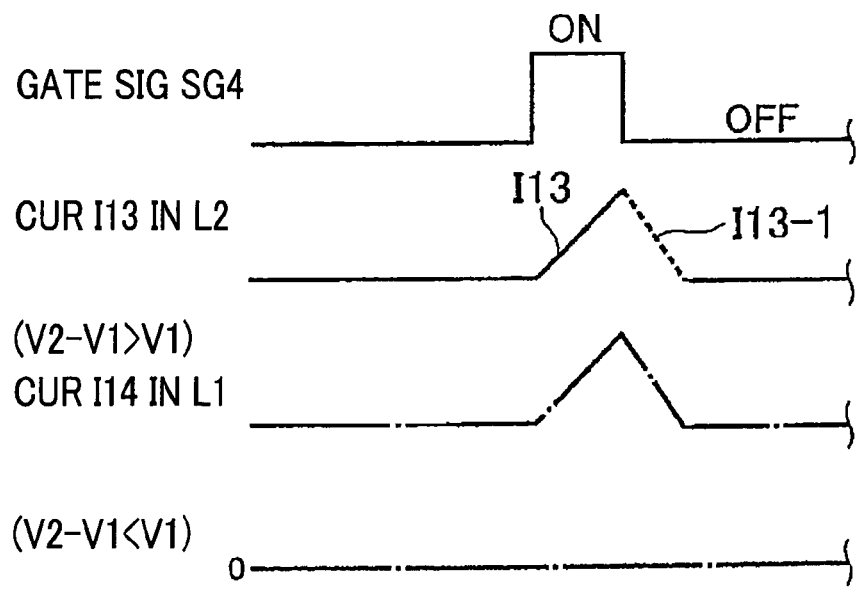
FIG. 19 is a waveform diagram for the second bucking operation example of the DC/DC converter.

Next, an example operation shown in FIG. 18 will be explained. In the DC/DC converter 16 shown in FIG. 18, the gate signal SG4 which turns ON/OFF the switching device SW4 is supplied to the gate of the switching device SW4. As shown in FIG. 19, as the gate signal SG4 is ON, the switching device SW4 turns ON. As a direct-current voltage V2 is input to the terminal TA2, and when the switching device SW4 turns ON, an excitation current I13 flows through the secondary winding L2 of the transformer T1. The excitation current I13 flows through the terminal TA2, the switching device SW4, the secondary winding L2 and the inductor L12. The excitation current I13 gradually increases while the gate signal SG4 is being ON. As the gate signal SG4 becomes OFF, the current I13 decreases, and becomes zero at last. A dashed line I13-1 of the current I13 shown in FIG. 19 is a current which flows because energy stored in the inductor L12 is released. The current corresponding to the dashed line I13-1 gradually decreases as the inductance of the inductor L12 is large. This current flows through the diode 22 of the switching device SW3, the secondary winding L2, and the inductor L12, and flows in the terminal TA1.

When the excitation current I13 flows through the secondary winding L2 of the transformer T1 as explained above, if V2−V1>V1, a load current I14 flows through the primary winding L1 due to mutual induction, and if V2−V1<V1, no load current flows. The load current I14 at the primary winding L1 is generated with the substantially same change characteristic as that of the excitation current I13, and with the substantially same value as that of the excitation current I13 based on the turn ratio (1:1) as shown in FIG. 19. The smoothing capacitor C1 is charged by the load current I14, and as a result, a direct-current voltage V1 based on the current I14 is output at the terminal TA1.

As explained above, according to the bucking operation of the DC/DC converter 16, since the DC/DC converter 16 has magnetism-canceling circuit portions (L1, I2, 21), first, as the switching device SW2 turns ON and the switching device SW4 turns OFF, an excitation current flows through the primary winding L1, and a load current flows through the secondary winding L2. Second, as the switching device SW4 turns ON and the switching device SW2 turns OFF, excitation current flows through the secondary winding L2 and load current flows through the primary winding L1. The transformer T1 is alternately excited positively and negatively in this manner, so that a flux density area of the core is used more and more. Accordingly, even if the winding (coil) is relatively small than the conventional ones, it is possible to cope with large power. Therefore, the bucking DC/DC converter 16 can achieve reduction in size.

Figure 20:
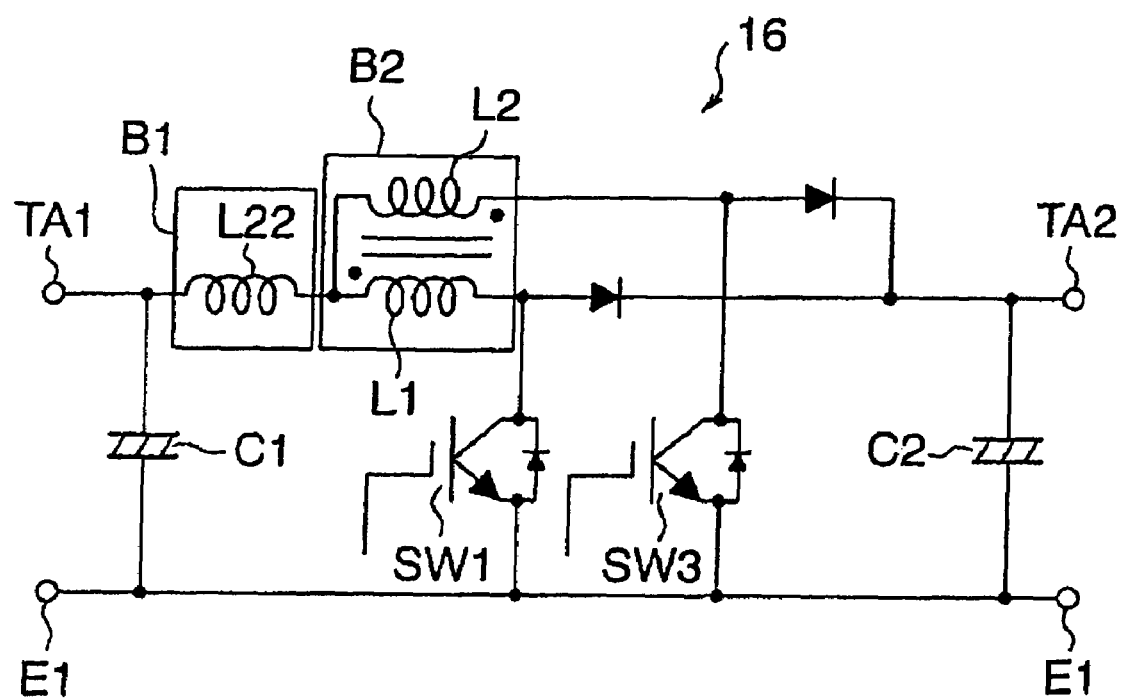
FIG. 20 is an electrical circuit diagram showing an equivalent circuit to the DC/DC converter shown in FIGS. 7A and 7B.

FIG. 20 shows an equivalent circuit of the DC/DC converter 16 shown in FIG. 7. In order to configure a circuit shown in FIG. 20, it is general that an inductor and a transformer are separately formed. That is, a block part (inductor L22) B1 in FIG. 20 and a block part (transformer) B2 are separately formed. According to the composite transformer 1 of the invention, however, as shown in FIG. 7A, the inductors L11, L12 and the transformer T1 are compactly formed as a single piece, so that it is possible to realize the DC/DC converter 16 which reduces the number of parts (the number of coils, etc.,) and the overall size of the circuit and the overall weight in comparison with the circuit shown in FIG. 20.

A direct-current voltage V1 output at the terminal TA1 is embodied as a sum of a voltage on the basis of the inductor L12 and a voltage of the secondary winding L2 of the transformer T1 because of the bucking function of the output voltage V1 relative to an input voltage V2. As a result, according to the bucking operation of the DC/DC converter 16, when the duty (t2) of the gate signal SG2, SG4 is less than or equal to 50%, the output voltage V1 is bucked to a desired value within a range from 1 to 0.5 times as much as the input voltage V2, and to a desired value within a range less than or equal to 0.5 times as much as the input voltage V2 if the duty is greater than or equal to 50%.

The structure, form, size and layout explained in the foregoing embodiment are merely examples to allow the person skilled in the art to understand and embody the present invention, and numerical values and compositions of individual components are just examples. Accordingly, the present invention should not be limited to the foregoing embodiment, and can be changed and modified in various forms within the broad spirit of the present invention recited in claims.

For example, the DC/DC converter 16 in a boosting/bucking circuit which is the power converter of the present invention is configured using IGBTs as the four switching devices SW1 to SW4, but the present invention is not limited to this configuration. For example, when the DC/DC converter 16 is used as a boosting circuit, first and second diodes may be used instead of IGBTs which are the switching devices SW2, SW4.

More specifically, the switching device SW2 is replaced with a first diode and the first diode is provided so as to be a forward direction from the connection node with the first winding 2 toward a second positive terminal (a connection node with TA2), and the switching device SW4 is replaced with a second diode and the second diode is provided so as to be a forward direction from a connection node with the second winding 3 toward the second positive terminal (a connection node with TA2), to configure a boosting circuit which is the power converter of the present invention.

By using the first and second diodes instead of the IGBTs which are the switching devices SW2, SW4, the configuration can be simplified.

Moreover, when the DC/DC converter 16 is used as a bucking circuit which is the power converter of the present invention, first and second diodes may be used instead of the IGBTs which are the switching devices SW1, SW3.

More specifically, the switching device SW1 is replaced with a first diode and the first diode is provided so as to be a forward direction from a connection node with the common reference terminal E1 toward a connection node with the first winding 2, and the switching device SW4 is replaced with a second diode and the second diode is provided so as to be a forward direction from a connection node with the common reference terminal E1 toward a connection node with the second winding 3, to configure a bucking circuit.

By using the first and second diodes instead of the IGBTs which are the switching devices SW1, SW3, the configuration can be simplified.

In the foregoing embodiment, the first winding 2 and the second winding 3 are spirally wound in a rectangular shape in a planar view (see FIG. 3), and are alternately overlapped with each other in such a way that the longer axial lines of the rectangles overlap with each other in the same direction (the first inductor 4, the transformer 6, and the second inductor 5 are disposed on the same straight line), but the present invention is not limited to this configuration. The first inductor 4 and the second inductor 5 may be disposed as to be apart from each other via the transformer 6 by overlapping the windings in a direction in which the longer axial lines of the rectangles cross or orthogonally cross.

The composite transformer of the present invention is used as an electrical circuit component which is an inductor and a transformer in a DC/DC converter used as a power unit of an electric vehicle or the like.

We claim:

1. A composite transformer comprising first and second windings which generate magnetic fluxes when excited and which are wound to form a first inductor, a second inductor, and a transformer, the composite transformer further comprising:
    a transformer core including a core leg around which a portion of the first winding and a portion of the second winding are wound, and a base fixing the core leg thereof;
    a first inductor core including a core leg around which another portion of the first winding is wound, and a base fixing the core leg thereof; and
    a second inductor core including a core leg around which another part of the second winding is wound, and a base fixing the core leg thereof, wherein:
    the first winding and the second winding are wound in such directions that magnetic fluxes generated by the first and second windings are cancelled with each other; and wherein
    the first winding and the second winding are wound around the core leg of the transformer core so as to be alternately overlapped with each other, and are respectively wound around the core leg of the first inductor core and the core leg of the second inductor so as to be apart from each other to suppress interference of the magnetic fluxes generated by the first and second windings.

2. The composite transformer according to claim 1, wherein the first and second windings have the same winding length.

3. The composite transformer according to claim 2, wherein the first and second windings have the same width.

4. The composite transformer according to claim 1, wherein the transformer core comprises divisional core pieces and the divisional core pieces are symmetrical relative to a divisional plane.

5. A power converter comprising the composite transformer according to claim 1, the power converter comprising:
    first and second input/output terminals, the first input/output terminal comprising a first positive terminal and a common reference terminal that is a negative terminal, the second input/output terminal comprising a second positive terminal and the common reference terminal, the first positive terminal of the first input/output terminal being connected to one ends of the first winding and the second winding;

a first switching device including one end connected to another end of the first winding, and another end connected to the common reference terminal;

a second switching device including one end connected to another end of the first winding, and another end connected to the second positive terminal of the second input/output terminal;

a third switching device including one end connected to another end of the second winding, and another end connected to the common reference terminal; and a fourth switching device including one end connected to another end of the second winding, and another end connected to the second positive terminal.

6. A power converter including the composite transformer according to claim 1, the power converter comprising:

input and output terminals, the input terminal comprising a first positive terminal and a common reference terminal that is a negative terminal, the output terminal comprising a second positive terminal and the common reference terminal, the first positive terminal of the input terminal being connected to one ends of the first winding and the second winding;

a first switching device including one end connected to another end of the first winding, and another end connected to the common reference terminal;

a first diode which includes one end connected to another end of the first winding, and another end connected to the second positive terminal of the output terminal, wherein a forward direction of the first diode is from another end of the first winding toward the second positive terminal;

a second switching device including one end connected to another end of the second winding, and another end connected to the common reference terminal; and a second diode which includes one end connected to another end of the second winding, and another end connected to the second positive terminal, wherein a forward direction of the second diode is from another end of the second winding toward the second positive terminal.

7. A power converter comprising the composite transformer according to claim 1, the power converter comprising:

input and output terminals, the output terminal comprising a first positive terminal and a common reference terminal that is a negative terminal, the input terminal comprising a second positive terminal and the common reference terminal, the first positive terminal of the output terminal being connected to one ends of the first winding and the second winding;

a first diode which includes one end connected to another end of the first winding, and another end connected to the common reference terminal, wherein a forward direction of the first diode is from the common reference terminal toward another end of the first winding;

a first switching device including one end connected to another end of the first winding, and another end connected to the second positive terminal of the input terminal;

a second diode which includes one end connected to another end of the second winding, and another end connected to the common reference terminal, wherein a forward direction of the second diode is from the common reference terminal toward another end of the second winding; and a second switching device including one end connected to another end of the second winding, and another end connected to the second positive terminal.

8. The power converter according to claim 5, wherein each of the switching devices comprises an IGBT.

9. The power converter according to claim 5, wherein each of the switching devices comprises a MOSFET.

* * * * *